US005573261A

United States Patent [19]

Miller

[11] Patent Number: 5,573,261
[45] Date of Patent: Nov. 12, 1996

[54] NARROW MANUALLY USER-PROPELLED WHEELCHAIR

[76] Inventor: S. David Miller, 20 Deer Run Rd., Williamsville, N.Y. 14221

[21] Appl. No.: 332,859

[22] Filed: Nov. 1, 1994

[51] Int. Cl.$^6$ ............................ A47K 11/04; A61G 5/02; B62M 1/14

[52] U.S. Cl. ................................ 280/250.1; 297/DIG. 4; 297/440.1; 297/440.24; 4/483

[58] Field of Search ................................ 280/250.1, 647, 280/650, 642, 304.1; 297/DIG. 4, 440.22, 440.1, 440.24; 4/483, 478, 480

[56] References Cited

U.S. PATENT DOCUMENTS

| | | | |
|---|---|---|---|
| D. 184,040 | 12/1958 | Crockett | 297/DIG. 4 X |
| 1,638,040 | 8/1927 | Killen | 4/480 |
| 2,455,168 | 11/1948 | Gilmore | 280/650 |
| 2,681,689 | 6/1954 | Breed | 155/30 |
| 2,753,919 | 7/1956 | Sill | 155/30 |
| 3,215,469 | 11/1965 | Wamsley | 297/DIG. 4 X |
| 3,301,574 | 1/1967 | Good | 280/250.1 X |
| 4,052,087 | 10/1977 | Gagliardi | 280/650 |
| 4,067,409 | 1/1978 | DiMatteo et al. | 180/6.5 |
| 4,268,054 | 5/1981 | Twitchell et al. | 280/242 |
| 4,287,619 | 9/1981 | Brewer et al. | 4/483 |
| 4,428,615 | 1/1984 | Hynson | 297/DIG. 4 X |
| 4,545,593 | 10/1985 | Farnam | 280/242 |
| 4,926,777 | 5/1990 | Davis, Jr. | 114/270 |
| 5,020,817 | 6/1991 | Leib | 280/250.1 |
| 5,020,818 | 6/1991 | Oxford | 280/250.1 |
| 5,064,211 | 11/1991 | Huttenhuis et al. | 280/250.1 |
| 5,068,927 | 12/1991 | Massaro | 4/480 |
| 5,163,188 | 11/1992 | Munroe | 5/81.1 |
| 5,201,087 | 4/1993 | Wickham et al. | 280/647 X |
| 5,380,034 | 1/1995 | Wilson | 297/DIG. 4 X |

FOREIGN PATENT DOCUMENTS

| | | | |
|---|---|---|---|
| 1297854 | 3/1987 | U.S.S.R. | 280/250.1 |
| 2224980 | 5/1990 | United Kingdom | 280/250.1 |

*Primary Examiner*—Kevin Hurley
*Assistant Examiner*—F. Zeender
*Attorney, Agent, or Firm*—Joseph P. Gastel

[57] ABSTRACT

A manually user-propelled wheelchair construction having a frame, a seat having a narrow front portion and a wider rear portion, a central axis on the seat, wheels on the frame proximate the front portion of the seat, with the wheels being oriented so that vertical planes passing through the wheels and parallel to the central axis of the seat also pass through the rear wider portion of the seat. The frame can be disassembled into a plurality of frame portions, a seat, and wheels.

23 Claims, 6 Drawing Sheets

NARROW MANUALLY USER-PROPELLED WHEELCHAIR

BACKGROUND OF THE INVENTION

The present invention relates to an improved manually user-propelled wheelchair which is of extremely narrow width.

By way of background, there are numerous types of wheelchairs in existence. However, insofar as known, the wheelchairs are relatively wide because the chairs have substantially rectangular seats and because the wheels extend outwardly beyond the sides of the seat, and thus wheelchairs having the foregoing type of construction cannot pass through narrow doorways or navigate through close areas, especially bathrooms wherein there may be limited space. This constitutes a great problem not only in older homes but also in older public facilities such as hotels, motels, theaters, restaurants and other public places which are now required by law to provide wheelchair access. In the past, the alternative was to incur remodeling expenses to accommodate the relatively wide prior types of wheelchairs. It is with providing a solution to the foregoing problem that the present invention is concerned.

SUMMARY OF THE INVENTION

It is the primary object of the present invention to provide a manually propelled wheelchair which is relatively narrow so that a user can independently maneuver through narrow doorways, narrow corridors, and other spaces which are relatively close.

It is another object of the present invention to provide a narrow wheelchair model which can be loaned to clientele by public places, such as older hotels, motels, restaurants and theaters, to provide wheelchair access through narrow doorways and to narrow places which would not accommodate conventional wide adult wheelchairs.

A further object of the present invention is to provide an improved wheelchair which can be readily disassembled into its component parts for ease of transportation. Other objects and attendant advantages of the present invention will readily be perceived hereafter.

The present invention relates to a wheelchair comprising a frame, a seat on said frame, said seat having a central axis and front portion for placement proximate the knees of a patient and a rear portion for placement proximate the hips of a patient, said rear portion being wider than said front portion, rear wheels on said frame, and manually drivable front wheels proximate said front portion of said seat, said front wheels being so oriented relative to said rear portion of said seat so that vertical planes which are substantially parallel to the central axis of said seat and pass through a portion of said front wheels also pass through said rear portion of said seat.

The present invention also relates to a wheelchair construction comprising a lower frame portion including a front lower frame portion which is U-shaped in plan having rearwardly extending first legs, a rear lower frame portion including two separate second legs which are selectively removably telescopically received in said first legs, a cross member extending between said first legs, two first columns extending upwardly from said cross member, a horizontal arm extending outwardly from each of said first columns, a front wheel selectively removably mounted on each of said horizontal arms, a rear wheel on each of said second legs, a first sleeve on each of said second legs, a second column removably telescopically received in and extending upwardly from each of the first sleeves on said two separate second legs, a seat having a front portion and a rear portion and an underside and an upper side, two second sleeves on said underside of said front portion for removably telescopically receiving said first columns, and two third sleeves on said rear portion of said seat for selectively removably telescopically receiving said second columns.

The various aspects of the present invention will be more fully understood when the following portions of the specification are read in conjunction with the accompanying drawings wherein:

DESCRIPTION OF THE PREFERRED EMBODIMENTS

Summarizing in advance, one aspect of the improved wheelchair 10 of the present invention is that it is of extremely narrow construction so that it can pass through narrow doorways and through narrow spaces. This narrow construction is possible because the seat is configured to have a wider rear portion for accommodating a person's hips and a front narrower portion for accommodating a person's thighs at the knees. The front wheels for manually propelling the wheelchair are located proximate the front narrower portion, and preferably their outermost portions are located inwardly of the wider rear portion of the seat. In other words, in the preferred embodiment the wheels do not extend outwardly beyond the widest portion of the seat.

Figure 9:
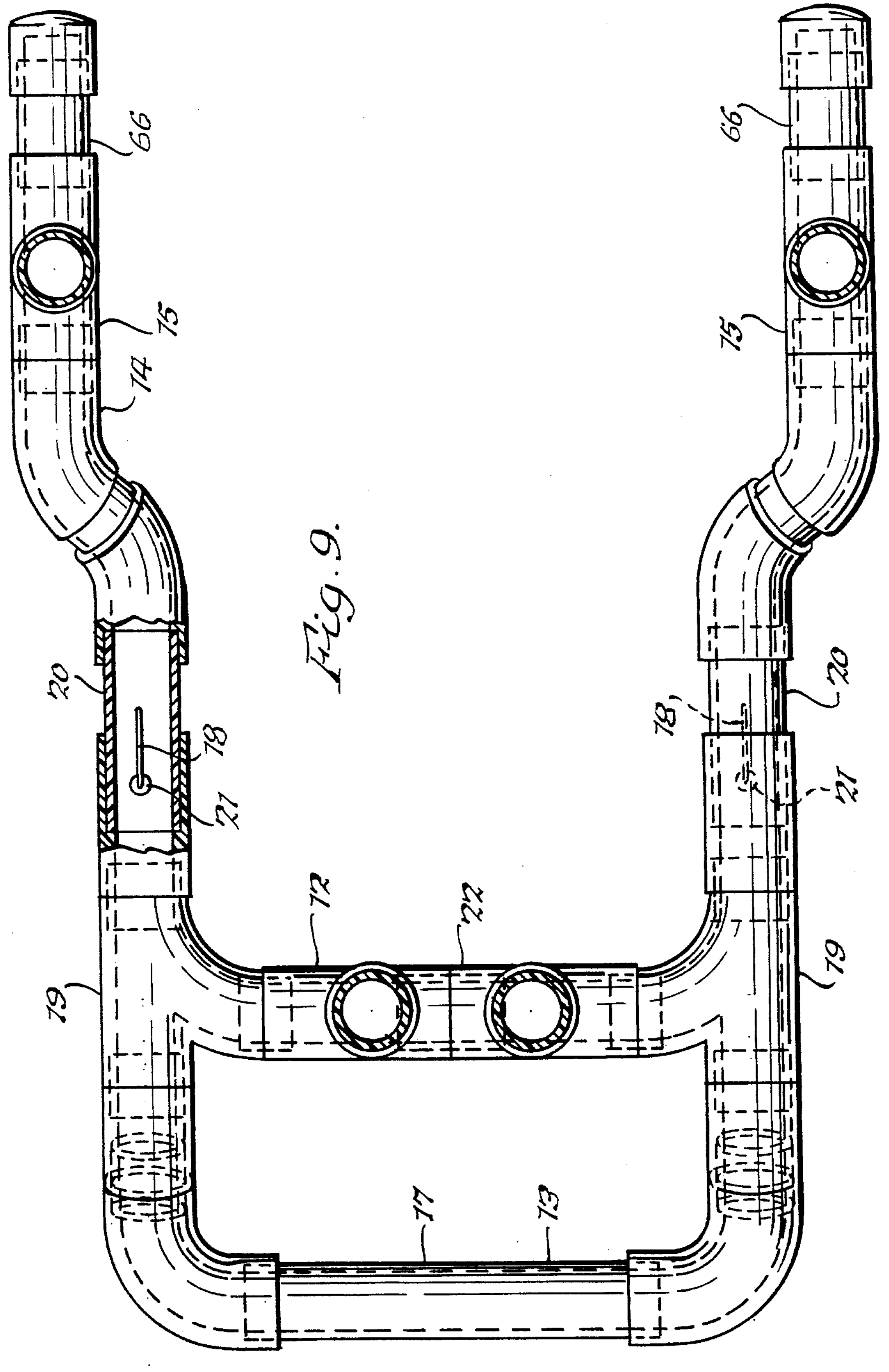
FIG. 9 is an enlarged cross sectional view, partially broken away, taken substantially along line 9—9 of FIG. 1 and showing the bottom portion of the frame.

One embodiment 10 of the improved wheelchair is shown in FIGS. 1–9. Prototype wheelchair 10 includes a frame fabricated of PVC tubing and PVC fittings. Frame 11 includes a lower portion 12 having a front portion 13 and a rear portion 14. The lower portion 12 of the frame is broadly U-shape in plan (FIG. 9). The front portion 13 of the frame is of one piece construction having a front footrest portion 17 and two rearwardly extending front legs 19 (FIG. 9). The rear portion 14 of the frame constitutes two separate rear legs 15 which have portions 20 (FIG. 9) which are slidably telescopically received in the ends of legs 19 and are retained therein by means of detents 21 (FIGS. 8 and 9), which are biased by springs 18. Detents 21 not only retain parts 19 and 20 in locked condition but also orient them in the attitudes shown in the drawings. Casters 16 are secured to the rear portions of legs 15.

The lower frame portion 12 also includes a cross member 22 (FIG. 9) which extends between and connects legs 19 and has two upstanding columns 23 (FIGS. 2 and 4) having horizontal arms 24 extending laterally therefrom which have outer end portions 25 which receive sleeves 27 (FIG. 5) which are rotatably mounted thereon and comprise the hubs of wheels 29. The end portions 25 of arms 24 extend outwardly beyond the outer sides 30 of manually drivable wheels 29 (FIG. 3), and spring-biased detents 28 (FIG. 6) retain wheels 29 mounted on arms 24. In this respect, detents 28 are mounted on blocks 28' which are retained within arms 20 by screws 29'.

A seat 31 is mounted on frame 11 by two front columns 32 at the front of the seat and two rear columns 33 at the rear of the seat. In this respect, front columns 32 extend upwardly from columns 23 and are received in sleeves or collars 34 which are fixedly secured to the underside 35 of seat 31. Rear columns 33 have lower end portions 37 which are slidably telescopically received in tubular portions or collars 39 (FIGS. 1 and 7) which extend upwardly from legs 15, and they have upper end portions 40 (FIG. 7) which are slidably telescopically received in sleeves 41 securely fixed to seat 31. The upper ends 43 (FIG. 7) of portions 40 of columns 33 abut ring 44 which is permanently fixed within sleeve 41. Posts 45 are slidably telescopically received in sleeves 41 with their lower ends 46 abutting rings 44, and a flexible strap 47 is secured to the upper ends of posts 45 to function as a back rest. All of the connections which are characterized as being "slidably telescopically" associated can be separated and reassembled so that the wheelchair can be transported in parts.

Figures 1, 2:
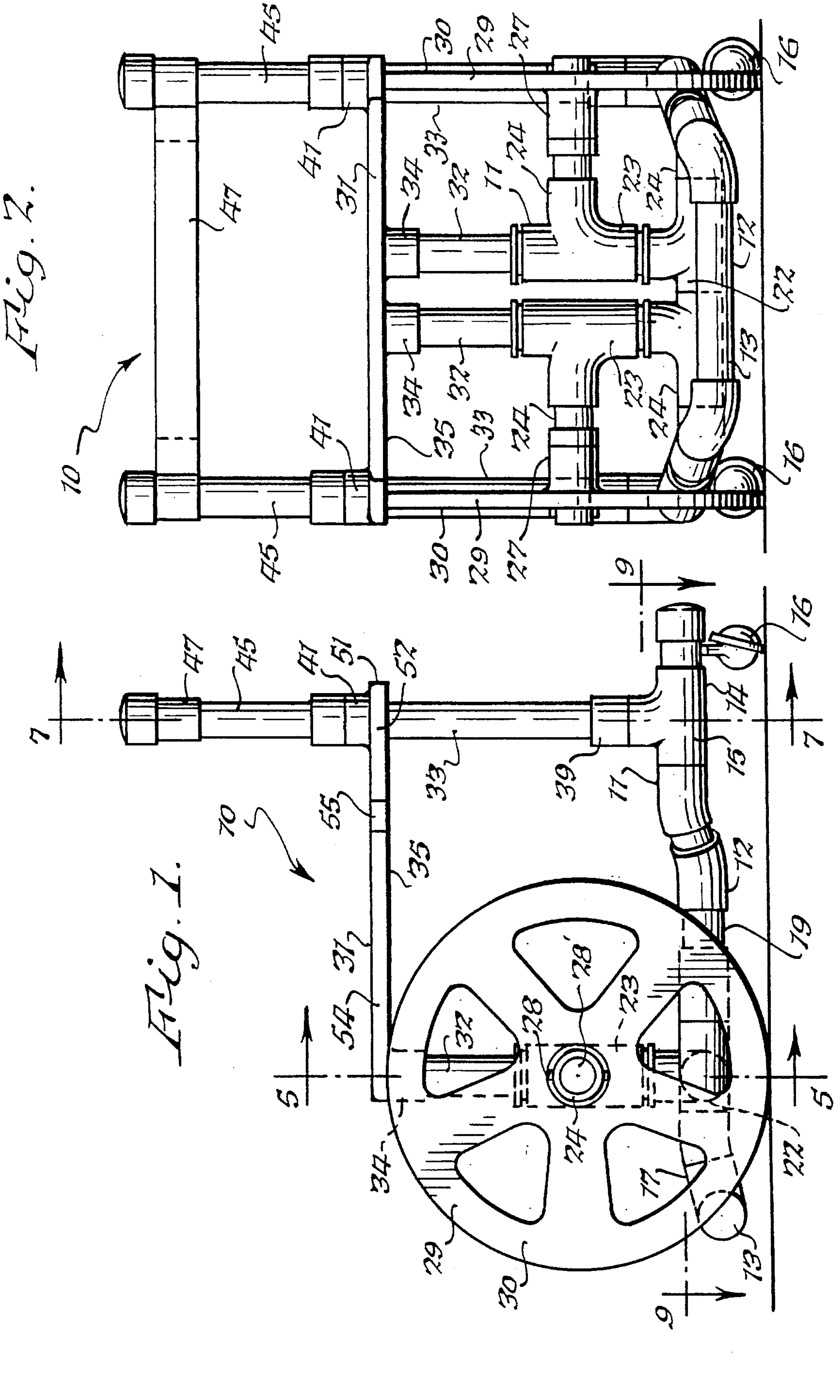
FIG. 1 is a side elevational view of the improved wheelchair.
FIG. 2 is a front elevational view of the improved wheelchair.
Figure 3:
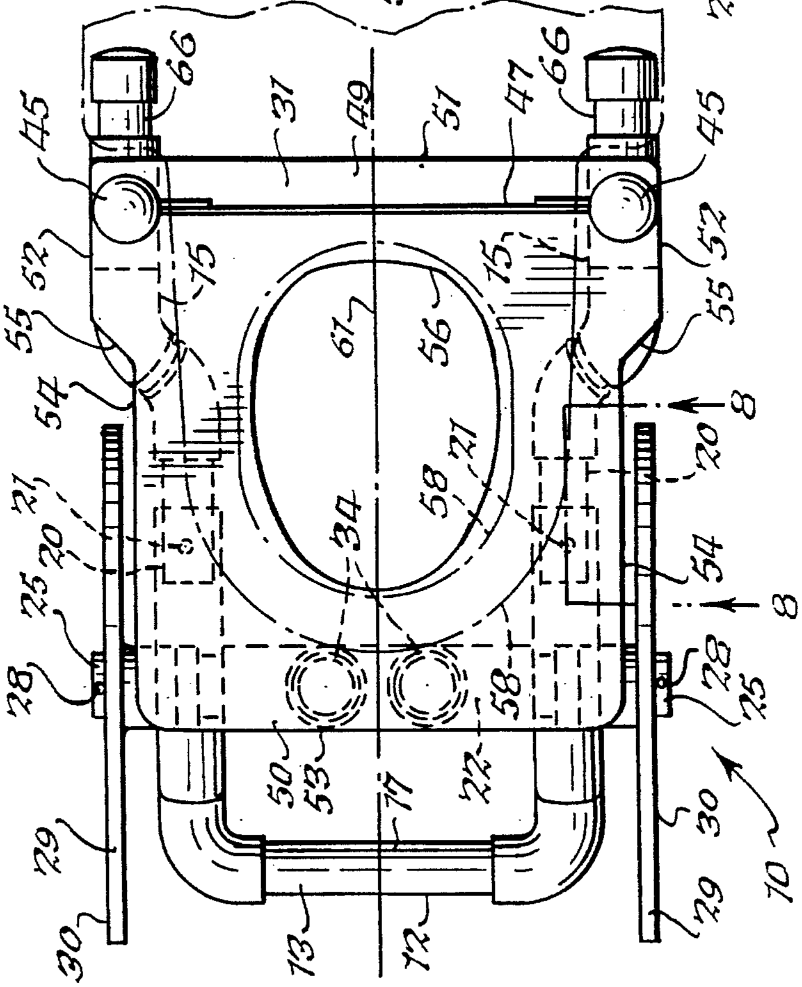
FIG. 3 is a plan view of the improved wheelchair in overlying relationship to a toilet bowl.
Figure 7:
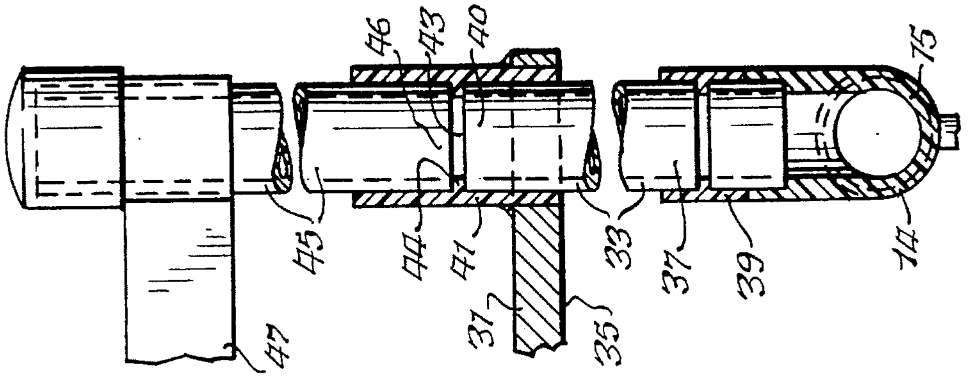
FIG. 7 is a fragmentary cross sectional view taken substantially along line 7—7 of FIG. 1 and showing various details of construction.
Figure 6:
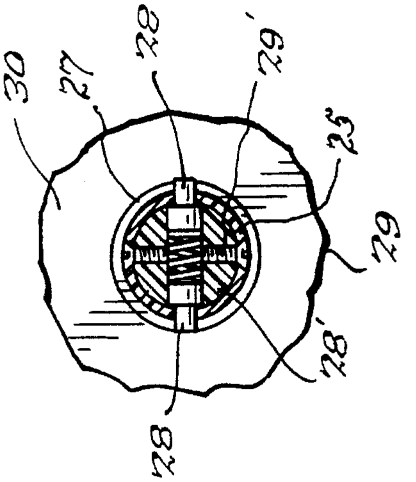
FIG. 6 is a fragmentary cross sectional view taken substantially along line 6—6 of FIG. 5 and showing the detent structure for retaining the wheel on its axle.
Figure 8:
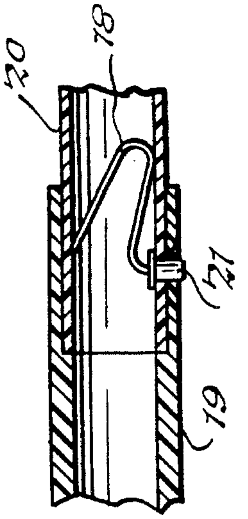
FIG. 8 is a fragmentary cross sectional view taken substantially along line 8—8 of FIG. 3 and showing the detent connection between two portions of the frame.
Figure 5:
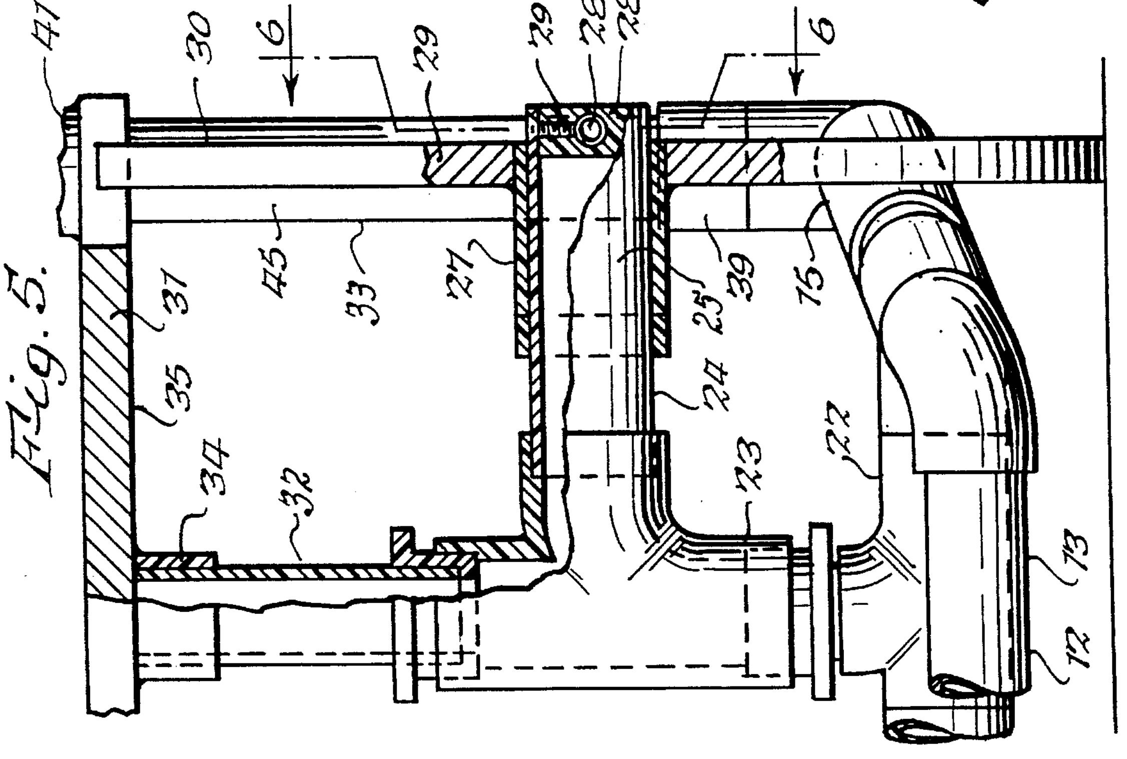
FIG. 5 is an enlarged fragmentary cross sectional view taken substantially along line 5—5 of FIG. 1 and showing various details of construction.

In accordance with one aspect of the present invention, the seat 31 is of the contour shown in plan in FIG. 3. In this respect it has a wider rear portion 49 and a narrower front portion 50. The wider rear portion 49 has a rear edge 51 and side edges 52. The front portion 50 has a front edge 53 and side edges 54. There are junctions 55 between front edges 54 and rear edges 52 of seat 31. It can readily be seen that front side edges 54 are closer together than rear side edges 52. This permits wheels 29 to be placed so that in the embodiment of FIGS. 1–9 the outer sides 30 of the wheels 29 do not extend outwardly beyond rear side edges 52 of seat 31. Thus vertical planes which pass through portions of the wheels 29, which are parallel to central axis 61 of the seat, also pass through the rear portion 49 of seat 31. The seat 31 is proportioned in the foregoing manner because the widest portion of the person's body is at the hips and a narrower portion is at the lower ends of the thighs at the knees. Thus, a person can sit comfortably on seat 31 because his hips will be accommodated by the wider rear portion 49 of seat 31 and the front ends of the thighs can be accommodated by the narrower front portion 50 of the seat.

In addition to the foregoing, it can be seen from FIG. 1 that the upper side 42 of seat 31 is higher than the highest portions of wheels 29. Thus, the patient can slide laterally onto seat 31 because wheels 29 will not obstruct this type of movement.

Seat 31 has the following dimensions which are given by way of example and not of limitation. Rear edge 51 is 55 centimeters or 21.6 inches long; front edge 53 is 44.5 centimeters or 17.5 inches long; rear sides 52 are 14 centimeters or 5.5 inches long; front sides 54 are 29 centimeters or 11.5 inches long; and junctions 55 are 7.5 centimeters or 3 inches long. The seat 31 is symmetrical about its central axis 61 (FIG. 3). The wheels 29 are three quarters of an inch thick. The foregoing dimensions are given by way of example and not of limitation. In this respect the dimensions are for an adult wheelchair. However, the seat can be made narrower.

Figure 4:
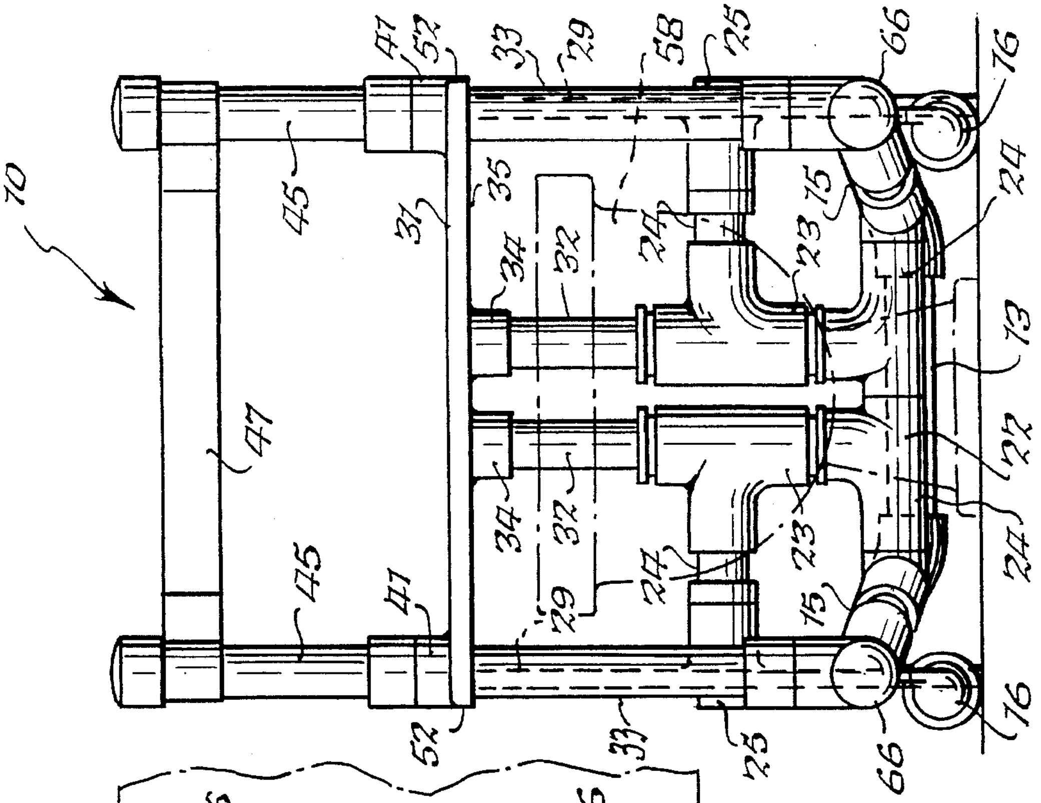
FIG. 4 is a rear elevational view of the improved wheelchair straddling the toilet bowl.

The seat 31 is shown as having a central opening 56 which overlies a toilet bowl 58 when the wheelchair is backed over the toilet bowl to the position shown in FIGS. 3 and 4. In this respect it is to be noted from FIGS. 3 and 9 that the rear leg portions 15 are configured with their rearmost portions 66 being wider apart than their front portions at 20 by virtue of the construction which includes elbows 68 (FIG. 9). The contour of the lower frame portion 12 wherein front legs 19 are closer together than portions 66 of rear legs 15 permits the front wheels 29 to be spaced apart less than if the front legs 19 were spaced apart the same amount as rear leg portions 66. Additionally, it is to be noted from FIGS. 3 and 4 that the relative closeness of portions 20 of front legs 19 is consistent with the lower portion 12 of the frame accommodating the contour of a toilet bowl 58. Thus, the leg portions 20 of the lower frame portion 12 not only permit the front wheels 29 to be relatively close but they also are located sufficiently low so that they can receive the lower portion of a toilet bowl between them. However, it will be appreciated that the wheelchair can have a seat without an opening such as 56, and in such a configuration, the rear portion of the frame need not be open to receive a toilet bowl.

Figure 10:
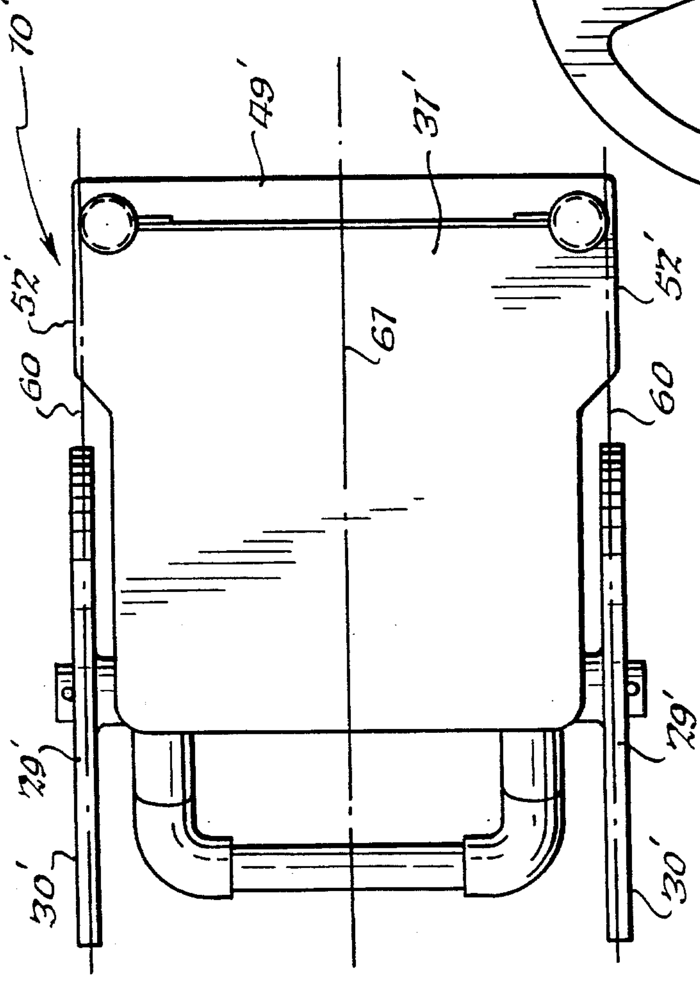
FIG. 10 is a plan view of an alternate embodiment of the present invention.

In FIG. 10 a plan view of another wheelchair embodiment 10' of the present invention is shown wherein vertical planes 60, which are parallel to the central axis 61 of seat 31', fall between the inner and outer sides of wheels 29' and intersect the rear portion 49' of seat 31. In this respect, it is to be noted that the outer sides 30' of wheels 29' are located laterally outwardly of the rear side edges 52' of seat 31', but the overall width in plan of the wheelchair is still relatively narrow in view of the fact that the wheels 29' do not in their entirety extend laterally outwardly of the rear sides 52' of seat 31', as they would have to if they were located at rear side edges 52'. In the foregoing construction, for a seat of the above dimensions, the maximum width across the front wheels would be about 59 centimeters or 23 inches. A modification of the present embodiment encompasses structure wherein the planes pass through the hubs, which are portions of the front wheels, but the remainder of the wheels lie outside of the rear portions of the seat, thereby still causing the wheelchair in its entirety to be relatively narrow because the front wheels are located proximate the narrow front portion of the seat. In the model which has the above-listed dimensions of the seat, if the wheels, except for the hubs, lie outside of the rear sides of the seat, the maximum width across the front wheels would only be slightly more than the above dimension of about 59 centimeters or 23 inches, thus still being narrower than a 25-inch doorway, which may be common in older buildings, such as homes, theaters, motels, hotels and other public places. In the foregoing respect, a standard adult wheelchair has an outside dimension of between about 25 and 28 inches and a narrow adult wheelchair has an outside dimension of about 24 inches, and it may be as narrow as about 23 inches. However, the last-mentioned very narrow wheelchair cannot accommodate a standard adult, as can the wheelchair of the present invention. The frame of wheelchair 10' may be identical to the frame of wheelchair 10 of FIGS. 1–9. The only differences between wheelchairs 10 and 10' is in the above-described placement of the wheels. The wheelchairs 10 and 10' can optionally use a seat 31 with a hole or a seat 31' without a hole.

In all of the preceding embodiments, wherein the wheels are no higher than the seat, the narrow front portion of the seat enhances manual grasping of the tops of the wheels for propelling the wheelchair.

Figure 11:
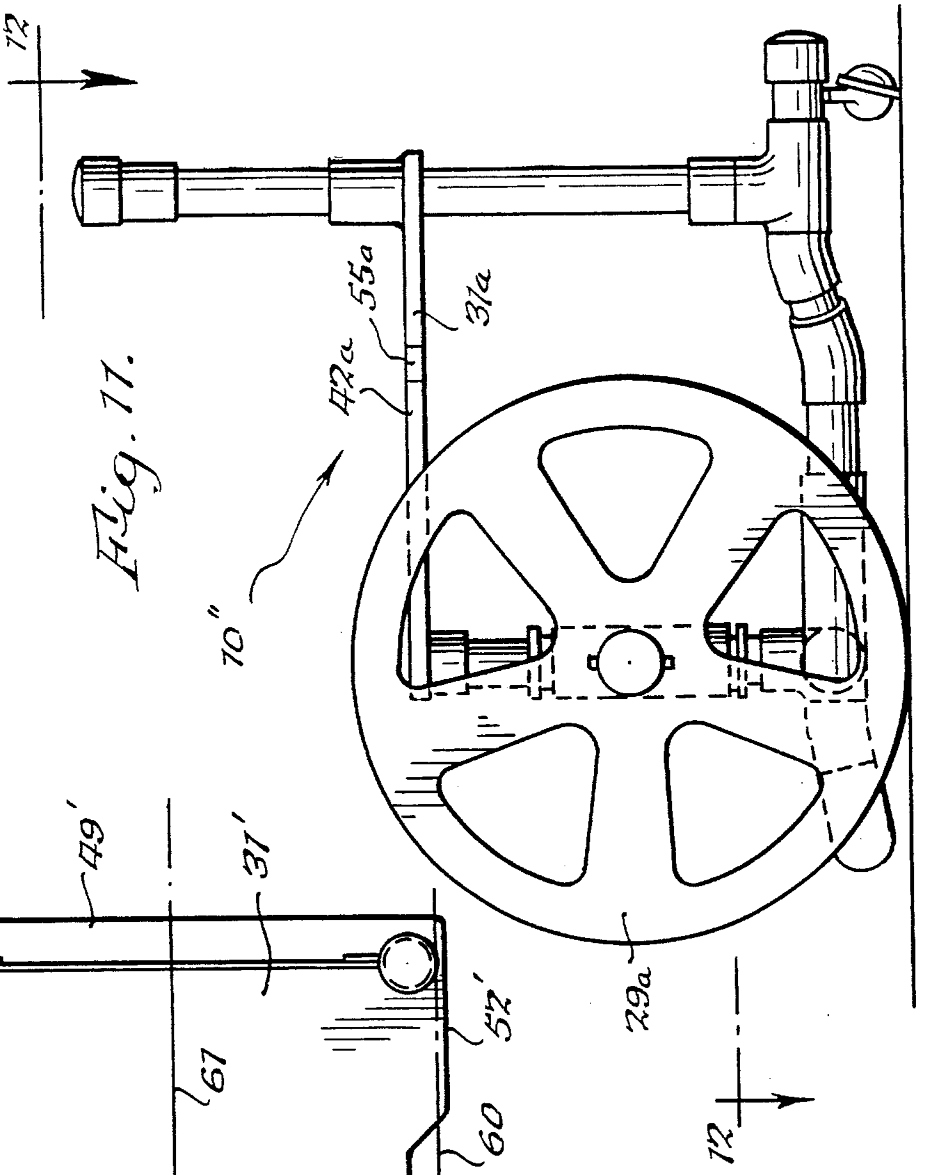
FIG. 11 is a side elevational view of still another embodiment of the present invention.
Figure 12:
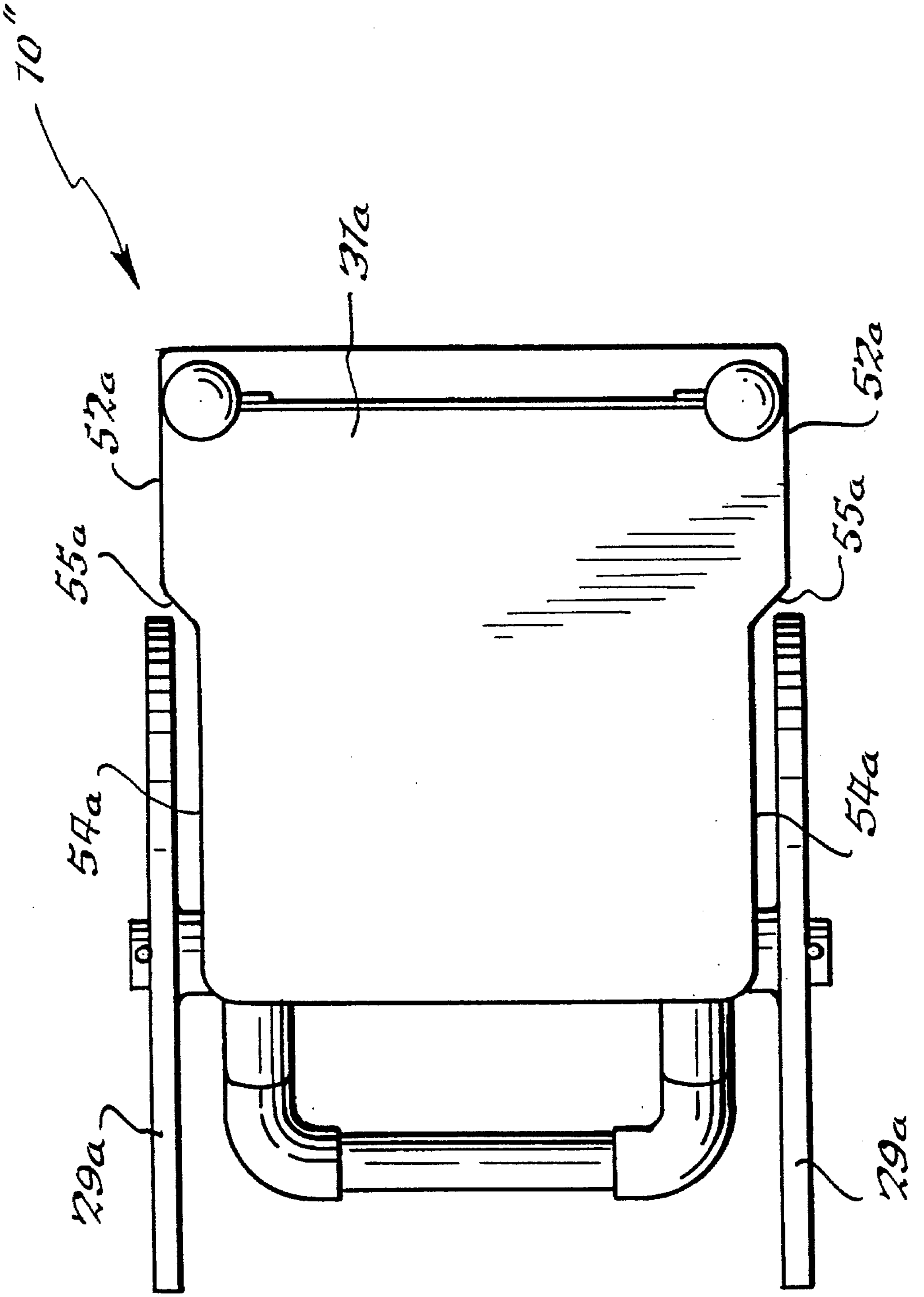
FIG. 12 is a plan view taken substantially in the direction of arrows 12—12 of FIG. 11.

In FIGS. 11 and 12 a further wheelchair embodiment 10" of the present invention is disclosed wherein the wheels **29*a* are of a diameter which causes them to be higher than the top 42*a*of seat 31*a*. This can be achieved by either moving the wheels more forwardly so that they do not contact the junctions 55*a* between sides 52*a* and 54*a* or by moving the junctions 55*a* rearwardly from the positions shown in FIG. 3. The advantage of having the larger wheels, such as shown in FIG. 11**, is that they extend higher than the top of the seat and thus are easier to reach.

From the foregoing it can be seen that the seat 29 is configured with a relatively narrow front portion to accommodate the knees of a person and a relatively wide rear portion to accommodate the wider hips of a person. The portion of the frame which underlies the front portion of the seat is relatively narrow. The foregoing being the case, the front wheels 29 can be spaced relatively closely because they are located at the front portion of the wheelchair opposite the relatively narrow front portions of both the seat and the frame. Therefore, the entire wheelchair can be made relatively narrow because it need not be any wider than either the relatively narrow span across the front wheels or the width of the rear portion of the seat.

It is to be noted that the wheelchair 10 can readily be disassembled for transportation because the following parts are separate and can be assembled telescopically. In this respect, seat 31, and sleeves 41 and 34 are one piece. Legs 15 are separate pieces. Front frame portion 12 consisting of portion 17, legs 19, columns 23, arms 24 and columns 32 are a separate piece. Posts 33 and 45 are separate pieces. Wheels 29 are separate pieces. In addition, if desired, columns 32 can also be separate pieces. Thus, the wheelchair 10 can be disassembled into the foregoing separate pieces for ease of transportation.

The embodiment shown in FIGS. 1–9 is a prototype which has been assembled out of PVC tubing and PVC fittings which are shown in quasi-schematic form in FIGS. 1–9. It is believed that a detailed verbal description of the PVC parts is not required inasmuch as they are known to persons skilled in the art. It will be appreciated, however, that the frame will preferably be made of preformed metal or preformed plastic tubing for practical use. Also, the frame can be made of metal or plastic tubing which cannot be disassembled.

It can thus be seen that the various embodiments of the present invention can be used in homes, motels, hotels,, theaters and other public places which require wheelchair access and have relatively narrow doorways, hallways, and other confined places which cannot accommodate a conventional adult wheelchair which has the real wheels extending laterally outwardly from the widest portion of the seat.

While preferred embodiments of the present invention have been disclosed, it will be appreciated that it is not limited thereto but may be otherwise embodied within the scope of the following claims.

What is claimed is:

1. A wheelchair comprising a frame, a seat on said frame, said seat having a central longitudinal axis and a substantially horizontal front portion for placement proximate the knees of a patient and a substantially horizontal rear portion for placement proximate the hips of a patient, said rear portion being wider than said front portion, rear wheels on said frame, and hand drivable front wheels proximate said front portion of said seat, each of said front wheels being rotatable in a respective fixed single substantially vertical plane and oriented relative to said rear portion of said seat so that each of said vertical planes is substantially parallel to said central longitudinal axis of said seat and passes through said rear portion of said seat.

2. A wheelchair as set forth in claim 1 wherein said frame includes a lower portion, a frame front portion located below said front portion of said seat, a frame rear portion located below said rear portion of said seat, and said rear portion of said frame being open to receive a toilet bowl.

3. A wheelchair as set forth in claim 2 wherein said frame rear portion is wider than said frame front portion.

4. A wheelchair as set forth in claim 1 wherein said front wheels do not extend above said seat.

5. A wheelchair as set forth in claim 4 wherein said frame includes a lower portion, a frame front portion located below said front portion of said seat, a frame rear portion located below said rear portion of said seat, and said rear portion of said frame being open to receive a toilet bowl.

6. A wheelchair as set forth in claim 5 wherein said frame rear portion is wider than said frame front portion.

7. A wheelchair as set forth in claim 1 wherein said front wheels extend above said seat.

8. A wheelchair as set forth in claim 7 wherein said frame includes a lower portion, a frame front portion located below said front portion of said seat, a frame rear portion located below said rear portion of said seat, and said rear portion of said frame being open to receive a toilet bowl.

9. A wheelchair as set forth in claim 1 wherein said frame includes a lower portion, a frame front portion on said lower portion located below said front portion of said seat, a frame rear portion on said lower portion located below said rear portion of said seat, said frame rear portion including spaced apart first legs, and said frame front portion including spaced apart second legs which are spaced apart less than said first legs to permit said front wheels to assume said orientation wherein said vertical planes pass through portions of said front wheels and said rear portion of said seat.

10. A wheelchair comprising a frame, a seat on said frame, said seat having a central longitudinal axis, a substantially horizontal front portion on said seat for placement proximate the knees of a patient, a substantially horizontal rear portion on said seat for placement proximate the hips of a patient, said rear portion of said seat being wider than said front portion of said seat, a lower portion on said frame, a frame front portion on said lower portion of said frame located below said front portion of said seat, a frame rear portion on said lower portion of said frame located below said rear portion of said seat, said frame rear portion including spaced apart first legs, said frame front portion including spaced apart second legs which are spaced apart less than said first legs, rear wheels on said frame, hand drivable front wheels on said frame located laterally outwardly of said second legs of said frame and said front portion of said seat, and each of said front wheels being rotatable in a respective single fixed substantially vertical plane and being oriented relative to said rear portion of said frame so that said vertical planes are substantially parallel to said central longitudinal axis of said seat and pass through said rear portion of said seat and said frame.

11. A wheelchair construction comprising a lower frame portion including a front lower frame portion which is U-shaped in plan having rearwardly extending first legs, a rear lower frame portion including two separate second legs which are selectively removably telescopically received in said first legs, a cross member extending between said first legs, two first columns extending upwardly from said cross member, a horizontal arm extending outwardly from each of said first columns, a front wheel selectively removably mounted on each of said horizontal arms, a rear wheel on each of said second legs, a first sleeve on each of said second legs, a second column removably telescopically received in and extending upwardly from each of the first sleeves on said two separate second legs, a seat having a front portion and a rear portion and an underside and an upper side, two second sleeves on said underside of said front portion for removably telescopically receiving said first columns, and two third sleeves on said rear portion of said seat for selectively removably telescopically receiving said second columns.

12. A wheelchair construction as set forth in claim 11 including two posts telescopically removably received in and extending upwardly from said third sleeves, and a member extending between said posts for providing a back rest.

13. A wheelchair construction as set forth in claim 11 wherein said front lower frame portion includes a portion extending between said first legs and positioned forwardly of said front portion of said seat for functioning as a foot rest.

14. A wheelchair construction as set forth in claim 13 including two posts telescopically removably received in and extending upwardly from said third sleeves, and a member extending between said posts for providing a back rest.

15. A wheelchair construction as set forth in claim 11 wherein said front portion of said seat is for placement proximate the knees of a patient, and wherein said rear portion of said seat is for placement proximate the hips of a patient, said front wheels being located proximate said front portion of said seat, a central axis on said seat, and said front wheels being so oriented relative to said rear portion of said seat so that vertical planes which are substantially parallel to said central axis of said seat and pass through portions of said front wheels also pass through said rear portion of said seat.

16. A wheelchair construction as set forth in claim 15 including two posts telescopically removably received in and extending upwardly from said third sleeves, and a member extending between said posts for providing a back rest.

17. A wheelchair construction as set forth in claim 15 wherein said front lower frame portion includes a portion extending between said first legs and positioned forwardly of said front portion of said seat for functioning as a foot rest.

18. A wheelchair construction as set forth in claim 17 including two posts telescopically removably received in and extending upwardly from said third sleeves, and a member extending between said posts for providing a back rest.

19. A wheelchair comprising a frame, a seat on said frame, said seat having a substantially horizontal front portion for placement proximate the knees of a patient and a substantially horizontal rear portion for placement proximate the hips of a patient, front side edges on said front portion, rear side edges on said rear portion, said rear portion being wider than said front portion by virtue of said front side edges of said front portion being closer together than said rear side edges of said rear portion, junctions between said front side edges and said rear side edges, rear wheels on said frame, and hand drivable front wheels having inner and outer sides proximate said front portion of said seat, each of said front wheels being rotatable in a respective single substantially fixed substantially vertical plane which falls between said inner and outer sides, said front wheels being located abreast of said front side edges and so oriented relative to said rear side edges of said seat so that said vertical planes pass through said junctions and said rear portion of said seat.

20. A wheelchair as set forth in claim 19 wherein said frame includes a lower portion, a frame front portion located below said front portion of said seat, a frame rear portion located below said rear portion of said seat, said frame rear portion being wider than said frame front portion.

21. A wheelchair as set forth in claim 19 wherein said front wheels do not extend above said seat

22. A wheelchair as set forth in claim 19 wherein said front wheels extend above said seat.

23. A wheelchair as set forth in claim 19 wherein said frame includes a lower portion, a frame front portion on said lower portion located below said front portion of said seat, a frame rear portion on said lower portion located below said rear portion of said seat, said frame rear portion including spaced apart first legs, and said frame front portion including spaced apart second legs which are spaced apart less than said first legs to permit said front wheels to assume said orientation wherein said vertical planes pass through portions of said front wheels and said rear portion of said seat.

* * * * *